United States Patent
Hörmann

(10) Patent No.: US 6,309,318 B1
(45) Date of Patent: Oct. 30, 2001

(54) CONNECTING ELEMENT FOR PROFILED BELT ENDS

(75) Inventor: Michael Hörmann, Halle (DE)

(73) Assignee: Marantec Antriebs-und Steuerungstechnik GmbH & Co. Produktions KG, Marienfield (DE)

( * ) Notice: Subject to any disclaimer, the term of this patent is extended or adjusted under 35 U.S.C. 154(b) by 0 days.

(21) Appl. No.: 09/194,821
(22) PCT Filed: Mar. 24, 1998
(86) PCT No.: PCT/EP98/01725
  § 371 Date: May 21, 1999
  § 102(e) Date: May 21, 1999
(87) PCT Pub. No.: WO98/45618
  PCT Pub. Date: Oct. 15, 1998

(30) Foreign Application Priority Data

Apr. 3, 1997 (DE) ............................ 297 05 941 U

(51) Int. Cl.[7] ..................................................... F16G 3/08
(52) U.S. Cl. ............................................. 474/255; 474/257
(58) Field of Search ....................... 474/95, 218, 253, 474/255, 257; 403/206, 209; 24/31 R, 32, 37, 31 B, 31 C

(56) References Cited

U.S. PATENT DOCUMENTS

| | | | |
|---|---|---|---|
| 2,430,328 | * 11/1947 | Daniels | 24/31 C |
| 3,605,201 | * 9/1971 | Peterson | 24/31 C |
| 3,924,301 | 12/1975 | Fox . | |
| 4,049,357 | 9/1977 | Hamisch, Jr. . | |
| 4,642,081 | * 2/1987 | Balomenos | 474/255 |
| 4,705,495 | * 11/1987 | Madion | 474/255 |
| 4,860,532 | * 8/1989 | Milz | 474/218 |
| 5,057,058 | * 10/1991 | Crudup | 474/95 |
| 5,391,121 | * 2/1995 | Schramm | 474/255 |
| 5,846,151 | * 12/1998 | Hormann | 474/253 |

FOREIGN PATENT DOCUMENTS

| | | |
|---|---|---|
| 8905227 | 3/1995 | (DE) . |
| 29705941 | 7/1997 | (DE) . |
| 8717016 | 3/1998 | (DE) . |
| 0764797 | 3/1997 | (EP) . |
| 93/17257 | 9/1993 | (WO) . |

* cited by examiner

*Primary Examiner*—Thomas R. Hannon
(74) *Attorney, Agent, or Firm*—Dilworth & Barrese LLP

(57) ABSTRACT

A connecting element for holding at least one profiled belt end comprises at least two parts which can be connected to one another and in the installed state, enclose the belt end. One or more of the parts have sections with a negative profile corresponding to the belt end. The belt end is inserted into one or more of the parts in manner such that connection is formed-locking in all directions that deviate from the direction of the joint.

19 Claims, 3 Drawing Sheets

CONNECTING ELEMENT FOR PROFILED BELT ENDS

BACKGROUND OF THE INVENTION

The invention relates to a connecting element for holding profiled belt ends.

For carrying out limited positioning movements, as occur for example during the opening and closing of gates or when operating machines that perform oscillatory movements, profiled belts, e.g. toothed belts, are used. Compared to chain drives the use of such belts has the advantage that they produce less noise. To meet the different requirements with regard to the length of the belts to be used, normally endless belts are used which can easily be reduced to the required size. Before operation the belt ends are joined together by connecting elements.

Such a connecting element is known from the DE-GM 87 17 016. The disclosed connecting element comprises two opposite engaging elements provided with a negative image of the profiled belt end, into which the belt ends are placed to create a connection which is form-locking in the direction of movement of the belt. This connection is secured against separating or shifting by pushing a sleeve onto each of the engaging elements with belt end. The sleeve has inside walls which are dimensioned in such a way that a pressing force is exerted on the belt end and engaging element when the sleeve has been pushed on, which is to avoid not only a separating of the two parts to be connected, but also loosening of the sleeve. In the DE-GM 89 05 227 a connecting device is disclosed with which the loosening of the pushed on sleeve is to be prevented by providing the sleeve with a projection which engages into an annular groove of the connecting element.

Such devices have the disadvantage that, due to the many parts that are required, the manufacture and installation becomes relatively complicated and expensive. Furthermore, the problem exists that, for example, due to vibrations or temperature fluctuations during operation the sleeve, the belt ends come loose from the connecting element.

SUMMARY OF THE INVENTION

The object of the present invention is to create a connecting element for profiled belt ends which ensures a secure connection and can easily be manufactured and installed.

Proceeding from a device of the type mentioned in the foregoing this object is achieved in that the connecting element according to the invention comprises at least two parts which can be connected to one another and in the installed state enclose the belt end, wherein one or more of the parts have sections with a negative profiling corresponding to the profile of the belt end, and wherein the belt end can be inserted into one or more of the parts in such a way that the connection is form-locking in all directions that deviate from the direction of the joint. Inserting the belt end into a part with a section shaped in this manner ensures that the inserted belt end is secured against shifting or separating not only in the direction of movement of the belt, but also in all directions that deviate from the direction of the joint. In the installed state the inserted belt end is enclosed by two or more parts, wherein the parts can be connected so that also a shifting in the direction of the joint is excluded.

According to a preferred embodiment of the present invention the parts of the connecting element are made identical. This simplifies the manufacture and supply of these parts and the replacing of a damaged part will not pose any problems.

If belts or belt ends with different profiles must be connected, then the parts of the connecting element according to the invention can be made such that differently profiled sections are provided for accommodating the belt ends.

To facilitate a joining together of the connectable parts of the connecting elements during installation, the parts may comprise pins and pin holes. For every pin on one of the parts a corresponding pin hole is provided on the to be connected part, so that an exact installation of the parts is possible.

In a further embodiment of the invention it is provided that the outside diameter of the pins and the inside diameter of the pin holes are made such that both during the joining together of the parts and also during the loosening of the parts frictional forces must be overcome. These frictional forces exceed the stresses that occur during operation as a result of vibrations or temperature fluctuations, as a result of which a loosening of the parts from one another and accordingly a loosening of the belt end from the connecting element is prevented.

The connection of the pins with the pin holes can be secured by material adhesion. Such a connection can be produced, for example, by applying an adhesive layer on the pins prior to the joining together.

In a further embodiment of the invention it is provided that the parts of the connecting element are provided with aligned bores to hold a screw. The inside diameter of such bores may be greater than the outside diameter of the screws, so that the screws must be secured by a nut. If the diameter of the bore is smaller than the outside diameter of the screws, screws are used for the connection which during the insertion cut a screw thread and in this way create a solid connection. The bores may also be provided with a pre-cut screw thread to hold corresponding screws.

The joining together of the parts of the connecting elements by screws ensures that the parts are joined together detachable, but also solidly, so that a shifting or loosening of the belt end in the direction of the joint is prevented.

For a further securing of the connection of the parts of the connecting element, the parts may have flexible projections as well as recesses, wherein the flexible projections of the one part engage in corresponding recesses of the part to be connected. This ensures a stable connection already before the parts are screwed together.

In a further embodiment of the present invention it is provided that, to loosen the projections from the recesses, openings are provided which extend from the outside of the parts of the connecting element to the projections. These openings are made in such a way that they are in line with the projections. If the parts of the connecting element must be separated, it is possible, for example, to introduce a screwdriver through the opening, as a result of which the flexible projections are bent in such a way that they are disengaged from the corresponding recesses.

According to a preferred embodiment of the present connection it is provided that the sections provided with a negative profiling are made in such a way that they correspond accurately to the profile of the belt end, as a result of which a force-locking in the direction of the joint is obtained. This ensures on the one hand a holding in position of the belt end in the parts of the connecting element during installation and on the other hand an additional securing against a shifting of the belt end in the direction of the joint.

The connecting element may be provided with a recess or groove to hold a driver. With gate drives, for example, this driver is provided on a skid which moves in accordance with the movement of the belt and by a mechanical connection with a gate brings about the opening an closing of the gate.

In a further embodiment of the present invention it is provided that in the installed state the connecting element has a cylindrical shape and the outside diameter of the cylinder is only slightly larger than the width of the accommodated belt. This embodiment has the advantage that the connecting element can also be used when only limited space is available and a construction with projections or edges would obstruct the movement of the belt or of the connecting element.

BRIEF DESCRIPTION OF THE DRAWINGS

Further details and advantages of the invention will be explained in greater detail with reference to an exemplified embodiment illustrated in the drawing, wherein.

DESCRIPTION OF THE PREFERRED EMBODIMENTS

Figure 1:
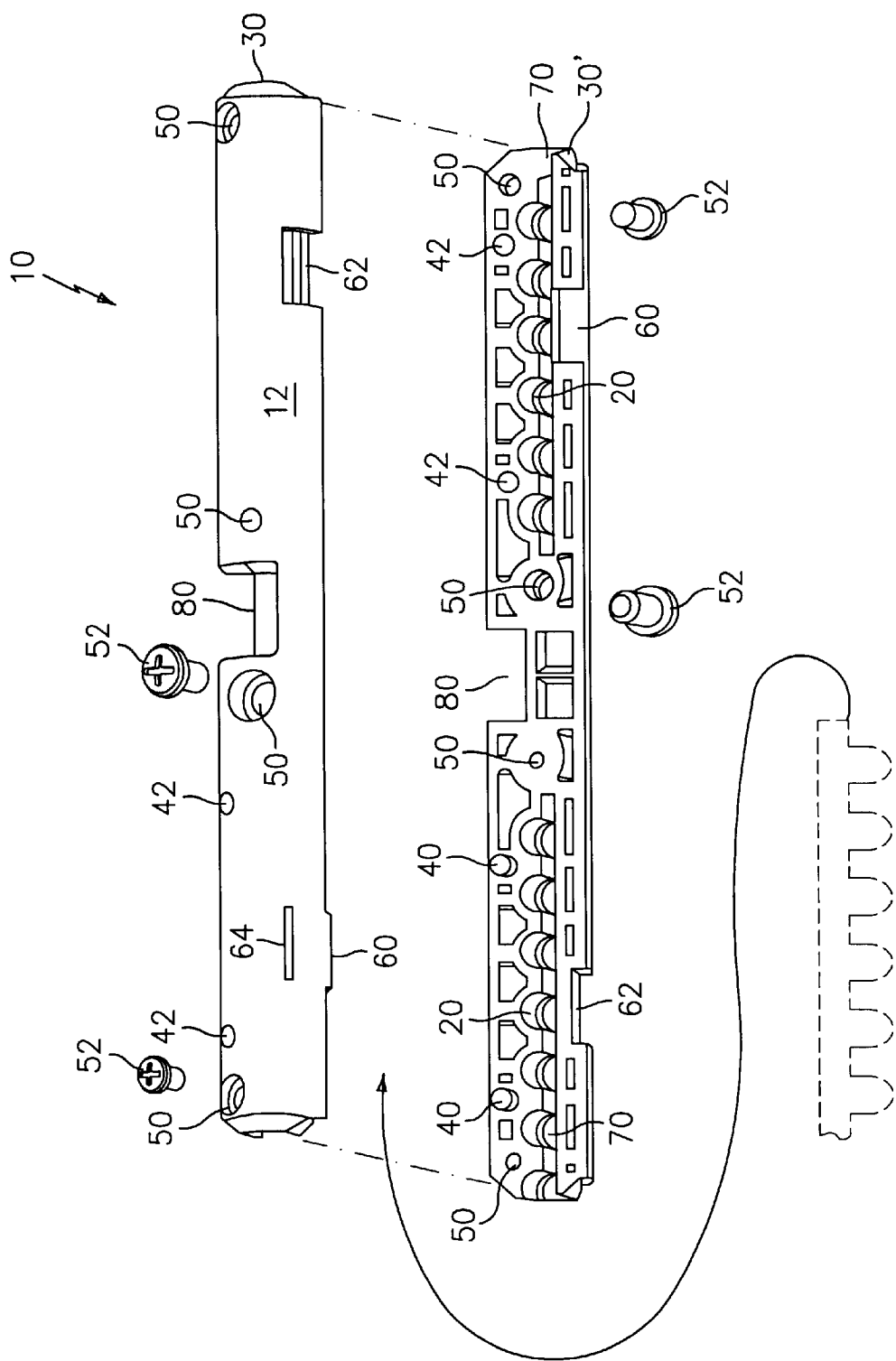
FIG. 1, FIG. 2 show perspective exploded views of the connecting element seen from different angles

The connecting element 10 illustrated in FIG. 1 comprises the two parts 30 and 30' which, after inserting one or several belt ends, can be connected to one another. The belt or belt ends are illustrated in phantom in the drawing. The part 30' has sections 20 which comprise a negative image of the profile of the belt end. The belt end is placed in the section 20 in such a way that a shifting or removing of the belt end from the part 30' is possible only in the direction of the joint. The teeth of the belt engage into the profiled side, which results in a form-locking connection in the direction of movement of the belt. Furthermore, a form-locking in all directions deviating from the direction of the joint is achieved in that the inserted belt end on the side opposite the profiling is bounded by the flat side of the section 20.

After inserting the belt end, part 30 is placed on part 30'. The part 30 may also have a negative image of the profile of the belt end in sections (not illustrated in the drawing) to accommodate the edge of the belt end projecting beyond the part 30'. However, if the belt end is accommodated over its entire width in the part 30', the part 30 will not have a profiled section and in this case serves as a cover. The stops 70 serve as a lateral delimitation and guide and accordingly ensure a correct inserting of the belt end.

The joining together of the parts 30 and 30' takes place with the aid of pins 40 and pin holes 42, wherein the two parts 30 and 30' each have corresponding pins 40 and pin holes 42. The pins 40 and pin holes 42 serve as a guide for the joining, together of the parts 30 and 30' and in addition, when the inside and outside diameters of the pins 40 and pin holes 42 are made with an accurate fit, can ensure a force-locking connection.

During operation the parts 30 and 30' are secured against separating in particular by the fact that screws 52 can be inserted through bores 50 which extend through both parts 30 and 30' and are in line with one another. With this the part 30' is held by the screw head by means of a phase in the bore 50, whereas the fixing of the part 30 takes place by a screw thread cut during the screwing in of the screw 52.

Figure 2:
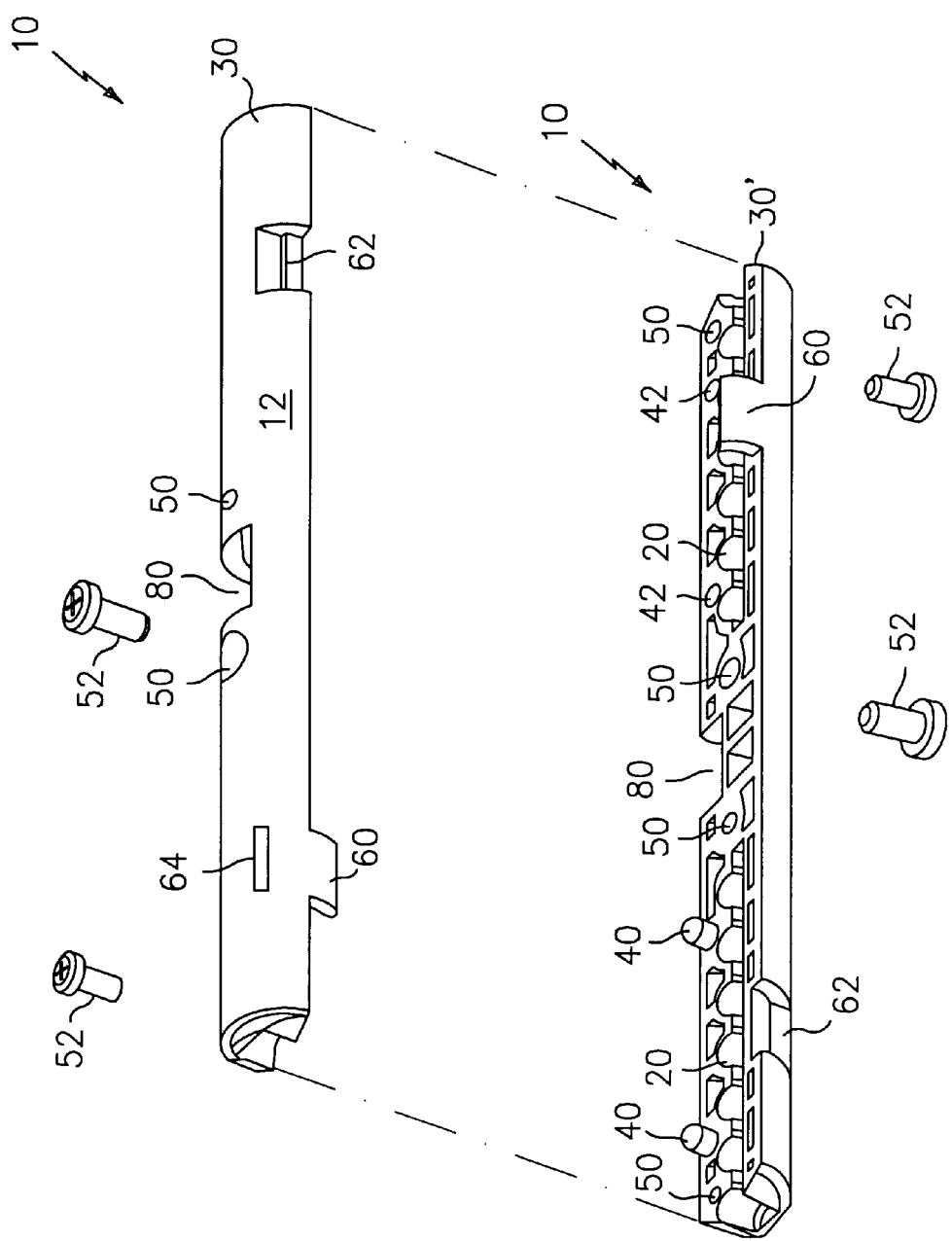

To prevent the parts 30 and 30' from separating already during installation as well as during operation, projections 60 and recesses 62 are provided, as can be noted in particular from FIG. 2. The projections 60 and recesses 62 extend on the outer periphery of the parts 30 and 30', wherein the two parts have corresponding projections and recesses. The projections 60 are made flexible and with an offset edge at their front end engage against a corresponding edge of the recess 62. During installation the flexible projection 60 is bent outwards until it engages into the recess 62. In the installed state the projections 62 form a smooth and, therefore, easy to handle surface with the outside 12 of the connecting element 10. A releasing of the projection 60 can take place on the one hand by lifting the projection 60 from the outside over the edge of the recess 62. On the other hand it is possible, for example, by introducing a screwdriver through a bore 64 provided in line with the projection 60, to bend the projection from the inside until the edges of the projection 60 and recess 62 are no longer in contact and the projection 60 can, therefore, be released.

As the connection by means of pins 40, screws 52 as well as projections 62 is detachable, the belt can be removed from the connecting element and be replaced by a longer or shorter belt.

Over part of the periphery of the connecting element 10 a recess 80 is provided in the middle of the parts 30 and 30'. This serves to accommodate a driver of, for example, a skid of a gate drive. The driver engages in the recess 80, but for safety reasons is not fixed to same.

After inserting the belt end in the parts 30 and 30' the connection element 10 has a cylindrical shape, wherein the outside diameter of the cylinder only slightly exceeds the width of the accommodated belt. This arrangement is particularly advantageous when only limited space is available for the belt, which excludes the use of a large connecting element or a connecting element with protuberant edges or projections.

Figure 3:
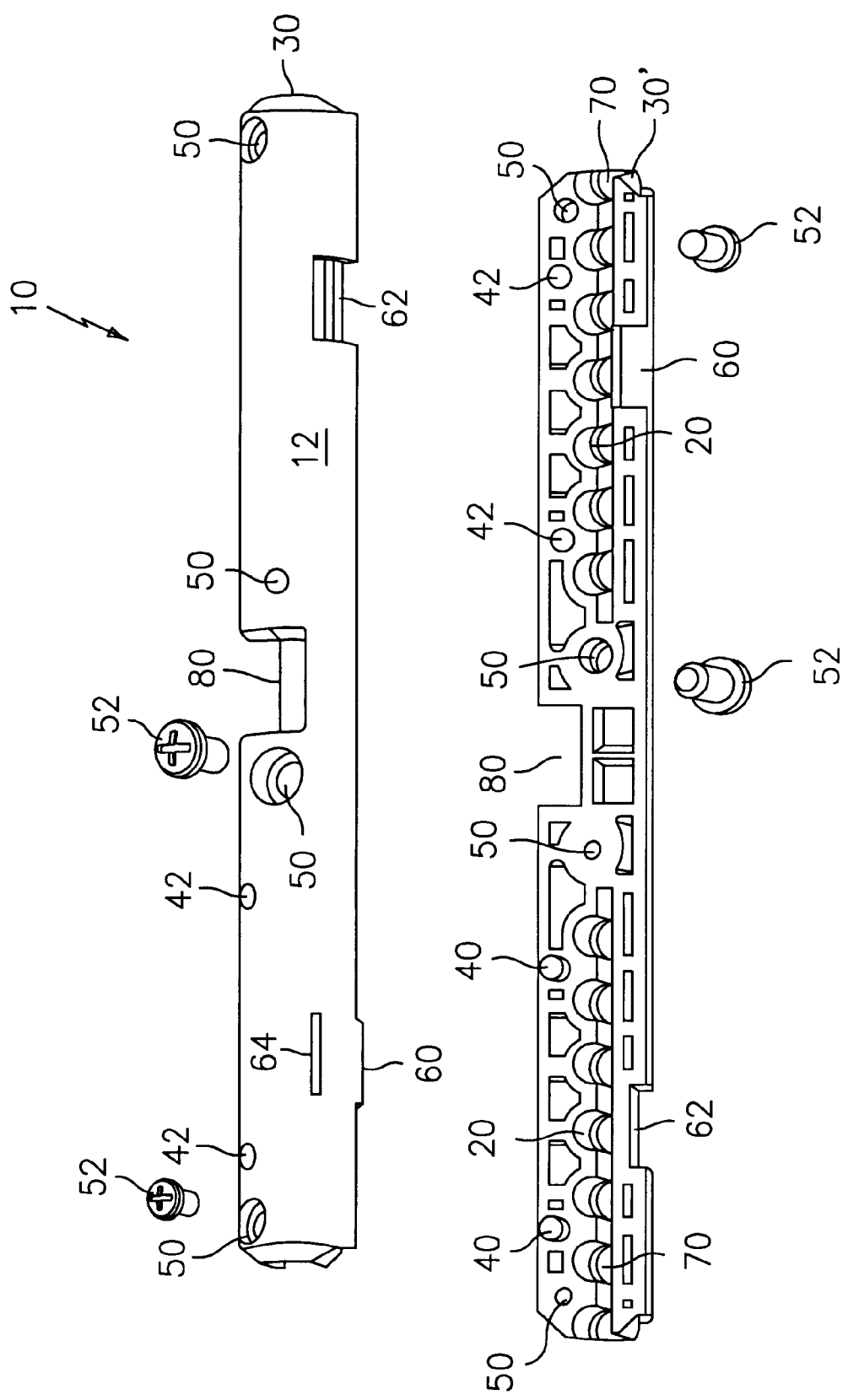
FIG. 3 shows a perspective exploded view of an alternative embodiment in accordance with the present invention.

FIG. 3 illustrated a perspective exploded view of an alternative embodiment in accordance with the present invention in which the parts 30, 30' forming the connecting element 10 have sections 20 with different negative profiles.

What is claimed is:

1. Connecting element (10) for holding at least one profiled belt end, the connecting element (10) comprising at least two separate parts (30, 30') which are structured and arranged to be connected to one another and in an installed state enclose the belt end therebetween, wherein one or more of the parts are (30, 30') has sections (20) each provided with a negative profiling corresponding to the profile of the belt end, the parts are structured and arranged to receive the belt end inserted into one or more of the parts (30, 30') in such a way that the connection is form-locking in all directions that deviate from the direction of the joint, and in order to connect belt ends with different profiles the parts (30,30') have sections (20) with different negative profiles.

2. Connecting element (10) according to claim 1, wherein the parts (30, 30') of the connecting element (10) are provided with aligned bores (50) to hold screws (52).

3. Connecting element (10) according to claim 2, wherein the parts (30,30') of the connecting element (10) comprise pins (40) and pin holes (42) wherein for every pin (40) on one of the parts (30) a corresponding pin hole (42) is provided on a part to be connected.

4. Connecting element (10) according to claim 1, wherein the connection between an inserted belt end and one or more of the parts (30, 30') of the connecting element (10) is force-locking in the direction of the joint.

5. Connecting element (10) according to claim 1, wherein the sections (20) with negative profiling have stops (70) for lateral guiding of the belt end.

6. Connecting element (10) according to claim 1, wherein at least one recess (80) or groove is provided to hold a driver.

7. Connecting element (10) according to claim 6, wherein said at least one recess (80) or groove is provided at a middle of the part (30, 30') in a longitudinal direction.

8. Connecting element (10) according to claim 1, wherein the parts (30,30') of the connecting element (10) comprise pins (40) and pin holes (42) wherein for every pin (40) on one of the parts (30) a corresponding pin hole (42) is provided on a part to be connected (30').

9. Connecting element (10) according to claim 1, wherein the connection is form-locking in all the directions deviating from the direction of the joint in that the inserted belt end on a side opposite the negative profiling is bounded by a side of the section (20) of the opposite, separate part (30) which can be flat or profiled.

10. Connecting element (10) according to claim 1, comprising two parts (30,30') with one of the parts (30') provided with a profiled section (20) and other of the parts (30) not having a profiled section and structured and arranged to serve as a cover.

11. Connecting element (10) according to claim 1, wherein the separate parts (30,30') are structured and arranged to continuously contact opposite surfaces of the inserted belt therebetween in a direction of movement of the belt.

12. Connecting element (10) for holding at least one profiled belt end, the connecting element (10) comprising at least two separate parts (30, 30') which are structured and arranged to be connected to one another and in an installed state enclose the belt end therebetween, wherein one or more of the parts (30, 30') has sections (20) each provided with a negative profiling corresponding to the profile of the belt end, the parts are structured and arranged to receive the belt end inserted into one or more of the parts (30, 30') in such a way that the connection is form-locking in all directions that deviate from the direction of the joint, and the parts (30, 30') possess identical profile sections.

13. Connecting element (10) for holding at least one profiled belt end, the connecting element (10) comprising at least two separate parts (30, 30') which are structured and arranged to be connected to one another and in an installed state enclosed the belt end therebetween, wherein one or more of the parts (30, 30') has sections (20) each provided with a negative profiling corresponding to the profile of the belt end, the parts are structured and arranged to receive the belt end inserted into one or more of the parts (30, 30') in such a way that the connection is form-locking in all directions that deviate from the direction of the joint, and the parts (30, 30') of the connecting element (10) comprise pins (40) and pin holes (42), wherein for every pin (40) on one of the parts (30) a corresponding pin hole (42) is provided on a part to be connected (30').

14. Connecting element (10) according to claim 13, wherein the outside diameter of the pins (40) and the inside diameter of the pin holes (42) are structured and arranged to one another in such a way that friction forces to be overcome during joining and loosening of the pins (40) from the pin holes (42) exceed the stresses that occur during operation in the direction of the friction forces.

15. Connecting element (10) according to claim 13, wherein the pins (40) are structured and arranged to be secured in the pin holes (42) by material adhesion.

16. Connecting element (10) for holding at least one profiled belt end, the connecting element (10) comprising at least two separate parts (30, 30') which are structured and arranged to be connected to one another and in an installed state enclose the belt end therebetween, wherein one or more of the parts (30, 30') has sections (20) each provided with a negative profiling corresponding to the profile of the belt end, the parts are structured and arranged to receive the belt end inserted into one or more of the parts (30, 30') in such a way that the connection is form-locking in all directions that deviate from the direction of the joint, and the parts (30, 30') of the connecting element (10) have flexible projections (60) as well as recesses (62), wherein the flexible projections (60) of the one part (30) are structured and arranged to engage in corresponding recesses (62) of a part to be connected (30').

17. Connecting element (10) according to claim 16, wherein to loosen the projections (60) from the recesses (62), openings (64) are provided which extend from outside (12) of the parts (30, 30') of the connecting element (10) to the projections (60) in such a way that the openings (64) are in line with the projections (60).

18. Connecting element (10) according to claim 16, wherein the parts (30,30') of the connecting element (10) comprise pins (40) and pin holes (42), wherein for every pin (40) on one of the parts (30) a corresponding pin hole (42) is provided on a part to be connected (30').

19. Connecting element (10) for holding at least one profiled belt end, the connecting element (10) comprising at least two separate parts (30, 30') which are structured and arranged to be connected to one another and in an installed state enclose the belt end therebetween, wherein one or more of the parts (30, 30') has sections (20) each provided with a negative profiling corresponding to the profile of the belt end, and the parts are structured and arranged to receive the belt end inserted into one or more of the parts (30, 30') in such a way that the connection is form-locking in all directions that deviate from the direction of the joint, and the shape of the connecting element in the installed state is cylindrical and the outside diameter of the cylinder is shaped to only slightly exceed width of an accommodated belt.

* * * * *